3,769,376
PROCESS FOR MAKING FIBER REINFORCED POLYURETHANE LAMINATES
Paul Georges Louis Arbaud, Chantilly, France, assignor to Ugine Kuhlmann, Paris, France
No Drawing. Filed Oct. 26, 1970, Ser. No. 84,158
Claims priority, application France, Oct. 30, 1969, 6937275
Int. Cl. C09j *3/16*
U.S. Cl. 156—331                                    7 Claims

ABSTRACT OF THE DISCLOSURE

Composite material comprising an outer polyurethane-based elastomer layer, an inner fibrous layer, an inner polyurethane-based elastomer layer and a fibrous layer as the other outer layer. The composite material may be prepared by applying to a non-adherent support, a liquid polycondensate containing free NCO groups and a liquid hardener or a hardener in solution in an inert solvent; then applying a layer of fibres on the layer thus obtained before total hardening; then simultaneously applying on the layer of fibres a liquid polycondensate containing free NCO groups and a liquid hardener or a hardener in solution in an inert organic solvent; then applying a second layer of fibres on the layer thus obtained before complete hardening and finally separating the material so produced from the non-adherent support.

---

The present invention concerns new composite materials and process for their manufacture.

It is already known to prepare materials comprising two joined layers, one having the appearance of the flesh side of leather, the other looking like the smooth side. In this case, the flesh side is, for example, made up of a fabric, knitted material, a sheet of fibres or non-woven material; the smooth side is, for example, formed from a film of polymeric material, such as polyvinyl chloride or a polyurethane, spread on the flesh side mentioned above by sizing or coating; the coating can occur either on the substrate itself or on a provisional support followed by transfer to the substrate.

When a particular porosity is required, it is obtained by using further chemical treatments, for example by treating with a liquid which must not dissolve the partly gelled polymer but is miscible in the solvent employed for the coating solution. This porosity can also be obtained by employing mechanical treatments, for example by perforation afterwards of the material by means of a system of fine needles which considerably diminishes the mechanical properties of the material.

It is also already known to agglomerate by means of plastic bonding agents, fibres or shavings of all kinds in order to obtain agglomerates which, according to the agglomerates and the agglomerating substance, lead to materials in the form of sheets the uses of which range from that of wood to that of leather, but which do not possess all the qualities peculiar to the materials replaced by these scheets.

To produce a material in the form of a flexible leaf having some of the uses of leather one agglomerates more especially, with the aid of emulsions or solutions of plastic bonding agents, fibres coming from shredded leather; the fluid pastes based on fibres and bonding agents are drained coagulated, calendered, dried and sandpapered.

The composite materials of this invention are based on non-thermoplastic bonding agents.

According to the present invention composite material is provided comprising an outer layer of polyurethane-based elastomer (1), an inner fibrous layer (2), an inner layer of polyurethane-based elastomer (3), and a fibrous layer (4) as the other outer layer.

There may, if required, be additional inner layers of elastomer and/or additional inner fibrous layers.

A layer of flexible foam in natural or synthetic latex, for example based on polyester or polyurethane, can be incorporated in the mass of the material in this invention.

In the material of the present invention successive layers of animal, vegetable or synthetic fibres, totally separated or naturally interwoven or previously interwoven artificially, are bonded together by means of successive layers of a polyurethane-based bonding agent. The fibres penetrate and perforate the films of the bonding agent. The adherence and cohesion between the layers are increased as well as the permeability of the material to water vapour. It is useful for the fibrous material with a base of naturally or artificially interwoven fibres to be porous or to present a surface on which the fibres are projecting. The polyurethane which performs the function of assembling agent with the following layer coats the superficial fibres and binds the underlying fibres.

The fibrous substance is advantageously leather especially because of its permeability to water vapour, its ability to absorb moisture and sweat, its strong resistance to repeated folding, to being nailed, to tearing, its dimensional variations as a function of its humidity and of the mechanical actions it undergoes. For economic reasons hides which are unsuitable for normal commercial purposes and leather waste of all kinds may be used such as, for example shavings, shaped pieces, offcuts, strips from the first, second or third saw cuts obtained by cutting a skin in the direction of thickness one, two or three times or strips from dry cuts.

Leather, the fibres of which are naturally interwoven, can be used just as it is, or after cutting up in the form of elementary fibres. The strips are advantageously sandpapered in such a way that their surfaces present fibres of $\frac{1}{10}$ mm. to several mms.

The fibrous material can be other than leather and one may use for example either exclusively or partially natural or synthetic textile fibres.

These fibres may be in their elementary state (flocks) or interwoven for example fabric, knitted material, sheet, non-woven material or plush). The fabrics are advantageously teased to bring up fibre elements of a few tenths of a mm. to a few mms.

The polyurethane-based bonding agents are elastomers resulting from the polycondensation of a polyol and a polyisocyanate when dealing with the elastomers of simple polyurethanes, and of a polyol, a poly-isocyanate and a polyamine when dealing with the elastomers of polyurethane-polyurea. The polyols may be polyethers or polyesters. The bonding agents are selected to advantage from among polyurethane-polyurea elastomers for the following reasons:

(a) The urea group distributed in the chain confer on the elastomer excellent mechanical properties especially concerning resistance to traction and tearing and make it possible to vary the mechanical properties of the elastomer over a very wide area;

(b) For the same ratio: urea: urethane, the increase in the molecular weight of the polyol employed makes it possible to improve hte elongation;

(c) Their resistance to hot and cold water is total. They also resist very well dilute acids and bases as well as solvents. Only strongly polar and aprotic solvents (for example dimethyl-formamide, diethylsulphoxide or dimethylsulphoxide), the use of which is not widespread in the leather industry can make them swell;

(d) Their resistance to ageing, even when damp, is excellent;

(e) Finally and above all their manufacture can be carried out at ambient temperature in a few minutes without the necessity of heating or further chemical treatment.

The bonding elastomers are preferably characterised by the following mechanical properties:

Breaking load: 70 to 350 kg./cm.$^2$
Elongation: 100 to 800%
Modulus 100%: 30 to 160 kg./cm.$^2$
Tearing: 20 to 135 kg./cm.
Shore Hardiness A: 60 to 98
Maximum compression: 600 to 1500 kg./cm.$^2$
Pressure required to reduce thickness by 25%: 30 to 90 kg./cm.$^2$ The prepolymers are chosen according to the final destination of the required article: thus for example very flexible for clothing and hard for the soles of shoes.

The internal elastomer layers preferably have a thickness varying from 1/10 mm. to 2 mms.

In one embodiment of this invention the composite materials can be prepared in the following manner:

One applies simultaneously on a non-adherent support a liquid condensate containing free NCO groups and a hardener in liquid form or in solution in an inert solvent, then one applies a layer of fibres on the layer thus obtained before total hardening of the condensate, then on the layer of fibres a liquid polycondensate containing free NCO groups and a hardener in liquid form or in solution in an inert organic solvent are simultaneously applied, then one applies a second layer of fibres on the layer thus obtained before total hardening of the condensate. These operations may be repeated if necessary until the desired thickness is produced and finally the material so produced is separated from the non-adherent support.

The two principal reactions involved in the preparation of the elastomers are those of the isocyanate group on an OH function which leads to a urethane group and that of the isocyanate group on an NH$_2$ function which leads to a urea group. One forms elastomers of simple polyurethanes or of polyurethane-polyurea.

In order to obtain a more convenient manipulation and an easier control of the lengthening reaction of the chains it is advantageous to use prepolymers which are products resulting from the poly-addition of polyols to poly-isocyanates in excess and are characterised by their content of free isocyanate groups.

According to the destination of the material to be produced one can use diverse types of prepolymers and diverse types of hardeners. The prepolymers are differentiated by the length of the polyol chains or mixtures of polyols in their composition and by their content of free isocyanate groups.

Condensed with hardeners they produce elastomers of polyurethanes or of polyurethane-polyureas. The hardeners (for example water, polyols, polyesters, polyethers or polyamines) are differentiated by their ability to react more or less quickly with prepolymers.

Certain compositions already used for moulding elastomers or their projection have proved suitable for use in the present invention. They can be obtained, for example, by bringing into contact a polyether-polyurethane prepared beforehand by reaction of polyethers, polyols and polyisocyanates in excess, in such a way that the ratio NCO/OH is between 1.5 and 3 and preferably at least equal to 2 with an aromatic diamine in solution in a solvent. The proportions of the prepolymer polyether-polyurethane and of the diamine can then be advantageously such that the ratio NH$_2$/OH is higher than 0.5 and preferably between 0.5 and 2 and the ratio $$NCO/OH+NH_2$$

is between about 0.95 and about 1.6.

The prepolymer can, for example, be prepared with polyglycols mixed in such a way that the average molecular weight is between 400 and 4000; to them is added toluene di-isocyanate so that the ratio NCO/OH is higher than 1.5 and preferably equal to 2 and one heats at about 50–150° C. for 1 to 5 hours in an atmosphere of inert gas. One can thus obtain a prepolymer having a viscosity between 4000 and 20,000 centipoises at 25° C.

Diamines used as hardeners may have a slow or fast reaction depending on the requisite conditions of manufacture. For example, 4,4'-diamino-3,3'-dichloro-diphenyl-methane, 3,3' - dichloro-benzidine, diamino-diphenyl-methane, o-tolidine or a phenylene diamine may be used. The diamines can be dissolved in ketonic solvents, chlorinated hydrocarbons, aldehydes or esters.

The permeability of the material being increased by the shrinking of the fibres, one can favourably exploit their dimensional variations as a function of the humidity. Thus, a cow hide chrome tanned with 3% of $Cr_2O_3$ and retanned with 7% of vegetable tannin (Mimosa) possesses the characteristic of having a surface variation between about 16% and about 7% when its humidity falls from about 35% to about 16%. In the same hide, defibrillated, the fibres shrink according to their size from 5% to 15% in length and from 2% to 10% in diameter when their humidity falls from 30 % to 18%. Animal, vegetable or synthetic fibres can be conditioned to a level of humidity higher than the normal level of the ambient medium. The level of humidity based on the weight of the dehydrated fibres can go up to 30%.

In order to put the process of this invention into effect one can work for example, by one or other of the following methods:

(1) One spreads by any appropriate method on a non-adherent surface, (for example, siliconised paper, siliconised metal, silicone elastomers or polyethylene) which may be either smooth or artificially grained or made by moulding the hair side of a true leather, a layer of polyurethane preferably already permeable to water vapour (preferably a polyurethane-polyurea) and, immediately after this application one spreads by any suitable means a layer of fibres (preferably leather reduced to fibres) in such a way that the fibres ensure at the same time both the perforation of the preceding layer and bonding with the following layer; the operation can then be repeated several times until the required thickness is produced and terminated by the spreading of fibres in order to give to the material on its outer face the appearance of the flesh side of leather;

(2) One replaces the spreading operation of (1) by the use of a substrate in the form of a sheet, for example, leather unsuitable for normal commercial purposes because of its lack of thickness or mechanical properties, and applies a thin layer of polyurethane, preferably permeable to water vapour, and immediately after this application applies a second layer of a material in sheet form whether identical or not with the preceding one; the operation may then be repeated at will until the required thickness is obtained and completed either by the application of a sheet of material, or by application of fibres;

(3) One combines completely or partially the procedures described in (1) and (2).

In all three cases the operation takes place at normal room temperature, without further chemical treatment, without heating, without gelling and without further mechanical treatment; it can be very rapid and lasts only a few minutes.

Industrially one can have recourse either to a curtain coating machine, or to conventional systems of coating using a doctor or a roller, or to a machine of the spray gun type projecting two constituents with external mixing. In order to profit by all the advantages of the new technique, it is important that the formation of the elastomer should be fast and not entail any complementary chemical operation. It is also important that the elastomer should possess adhesive properties. This condition is obtained when the formation of the polyurethane is not terminated chemically and when the solvents are not entirely evaporated.

One can for example proceed as follows:

With the aid for example of one or other of the machines mentioned above one spreads a thin layer (1 to 5/10 mm.) of polyurethane on a non-adherent support. One then immediately projects onto this layer leather fibres having for example a length between 1/10 mm. and 7/10 mm. and a humidity of 6% to 35%. These fibres stick into the still soft elastomer perforate its surface in places and help to improve its porosity. These fibres are treated with a new layer of polyurethanes, then with another layer of fibres, then one possibly applies other alternate layers of polyurethanes and fibres, the fibres of the intermediate layers having for example a length of from 2/10 to 8/10 mm.; those of the last layer being for example from 3/10 to 5/10 mm. long. 5 to 30 minutes after the last application the material is separated from the non-adherent support. After 24 hours the shrinking of the leather fibres in the drying process increases the porosity of the material.

Although in general it is not necessary to complete manufacture of the material by heating or by treatment under pressure, one can employ one or other of these measures or both, with a view to obtaining specific results. The materials according to the invention can also be prepared using, instead of liquid polycondensate on the one hand and liquid hardener on the other, applied simultaneously, organic solutions containing at the same time both the hardener and the isocyanate or the prepolymer with NCO groupings. The organic solvents suitable for this effect are for example acetone, toluene, ethyl acetate, butyl acetate, dimethylformamide, and dimethylsulphoxide.

One can also use solutions or emulsions of simple polyurethanes or of polyurethane-polyurea.

It is within the scope of the invention to prepare an intermediate composite material containing at least instead of an elastomer layer (1) and a layer of elementary fibres (2), an outer layer of fibres previously interwoven (naturally or artificially), on the one hand, an inner elastomer layer, on the other, and an outer fibrous layer, and applying on the intermediate composite material (having 3 or more layers) thus produced an outer layer of polyurethane.

The materials in sheet form according to the invention have advantages over known materials in sheet form:

With regard to homogeneous plastic substances, they have a permeability to water vapor due in part to the qualities of the polyurethanes, partly to the perforations automatically produced by the process, and the potential to absorb moisture due to the presence of the fibres of the fibres-polyurethane complex.

With regard to assemblages of plastic substance and sheet materials in the form of coated sheets, they have a greater porosity.

With regard to leather itself, they are homogeneous in all their parts and, whether in continuous or discontinuous sheets, they ensure a maximum yield when being cut, making this possible in several thicknesses without waste.

By means of the present invention it is possible to manufacture composite material which is flexible, permeable to air and water vapour, unpermeable to liquid water, and resistant to tearing, splitting and pulling and which has the external appearance and the uses of leather for example in footwear (soles and uppers), the Morocco trade, furniture, car fittings and clothing.

The following examples in which the parts are shown by weight illustrates the invention.

EXAMPLE 1

The manufacture of finished imitation sheepskin is carried out in the following manner:

(a) Machine used.—Machine of the spray gun type and projecting two constituents with external mixing and mainly comprising a reserve vat of the prepolymer with heating, a storage vat of hardener, a dosage unit, a spray gun having external mixing and pulverisation of the products with a concentric jet comprising a conduit for air, a conduit for the prepolymer, a conduit for the hardener and a pneumatic spray gun for the projection of the fibres or a sieve for pouring out fibre.

(b) Prepolymer used.—One uses a prepolymer producing a flexible elastomer and corresponding after the reaction has been regulated to the following characteristics:

Viscosity: 12500 centipoises
Percent free NCO: 4.2±0.25
NCO/kg.: about 1.1 and prepared by reaction of 3.21 parts of dehydrated polypropylene-glycol of mean weight 2000, 1.28 parts of dehydrated polypropylene-glycol of mean weight 400 and 1.5 parts of toluene di-isocyanate heated together at 80° C. for 3 hours.

(c) Hardener used.—One uses as hardener a solution of 4,4'-diamino-diphenylmethane in methyl-ethyl-ketone, so that the ratio required for the reaction is 27 parts of diluted hardener to 100 parts of prepolymer corresponding to 11 parts of 4,4'-diamino diphenylmethane.

(d) Formation of the elastomer.—The prepolymer mentioned above is placed in a vat intended for its storage with 4% of a 20% dispersion of lampblack in butyl phthalate. The whole is heated to 40° C. The hardening solution is placed in a vat intended for its storage. By means of the dosage unit whose discharge has been regulated so that the ratio prepolymer:hardener is 3.7, one injects into the spray gun through the hardener through its conduit, and the prepolymer through its conduit heated to 110° C. in order to lower its viscosity. On emerging from the spray gun the two constituents are mixed by the eddy of air established with compressed air operating at a pressure of 4.5 kg./cm.². The spray gun is set in motion with a reciprocating sweeping movement 95 cm. wide and with 34 backward and forward motions per minute.

A mould of silicone elastomer obtained by moulding a sheepskin is caused to pass under the spray gun at a speed of 1 metre per minute; one thus obtains on the mould a film 2/10 mm. thick.

(e) Fibres used.—By carding a black velvet strip one obtains for each kg. of dry strip 700 g. of coloured fibres having dimensions between 1.5 cm and 2/10 mm. By grinding and shredding the remaining 300 g. in a machine with 4 rotating knives one obtains 250 g. of fibres of 2/10–5/10 mm. The first lot of fibres sorted by gravity under suction and filtering gives 150 g. of short fibres of 2/10–9/10 mm. which are mixed with the short fibres of the second lot and 440 fibres longer than 9/10 mm. All these separated fibres are conditioned at 26% humidity.

(f) Formation of the new materials.—Immediately after the removal from the mould of the elastomer projection, or 30 seconds after the beginning of the operation one projects with a pneumatic spray gun at 5 kg./cm.² 100 g. per square metre of elastomer surface of the short fibres previously sorted and conditioned.

The mould is again passed under the elastomer projection 45 seconds after the end of the projection of fibres and one again projects short fibres in the same conditions, then the mould is again passed under the elastomer projection and one finishes by projecting 200 g. per square metre of long fibres previously sorted.

10 minutes after the last projection one removes the new material from its non-adherent support and leaves it for 48 hours at a temperature of 18° C. which allows the elastomer to dry completely and possibly the leather fibres to shrink. The material thus obtained comprises six layers resistant to splitting: 3 layers of elastomers and 3 layers of elementary leather fibres successively alternating The material is given a velvety appearance on its flesh side with a rubbing machine covered with abrasive paper.

The material produced presents on its hair side the exact pattern of the hair side of the original sheepskin, One thus obtains a material similar to the hair side of brown improved calfskin and possessing the following characteristics in comparison with classic improved calfskin of the same thickness:

|  | Synthetic material | Improved calfskin |
|---|---|---|
| Thickness | 1.3 mm | 1.5 mm. |
| Resistance to tearing | 3 jg./mm. of thickness | 2.55 kg./mm. |
| Resistance to pulling | 2.1 kg./mm.² surface | 2.6 kg./mm.² |
| Resistance to grain cracking (see pages 775-776 of "Chemistry of Leather Manufacture" by McLaughlin and Theis—Reinhold 1945). | Arrow 12, pressure 60 kg | Arrow 13, pressure 55 kg. |
| Permeability to water vapour (24 hours) | 48.3 | 63.2. |
| Resistance to Bally flexometer | 100,000 | 100,000. |
| Resistance to abrasion (Crokmeter covered with abrasive paper of No. 250 grain) | 1,000 A.R. | 200 A.R. |
| Impermeability to water (under a 1 m. column of water) | More than 12 hours | 3 hours. | is covered with what is called leather finishing, has a velvety flesh side and possesses the following properties:

Thickness: 1 mm. homogeneous
Weight: 1 kg. 100
Resistance to pulling: 1.8 kg./mm.² of surface
Resistance to tearing: 1.4 kg./mm. of thickness
Permeability to water vapour 24 h.: 43.00
Resistance on Bally flexometer: 100,000
Impermeability to water (under a 1 m. water column): more than 12 hours

EXAMPLE 2

In conditions similar to those used in Example 1, in order to produce continuously a material tending to imitate the improved hair side of calfskin used in the footwear industry, one applies to silicon paper continuously unrolling at 1 m./min. from minute to minute, or from metre to metre, 290 g. per square metre of a mixture of a prepolymer prepared as set out in Example 1, but having the following characteristics:

Viscosity at 50° C.: 580 centipoises
Percent free NCO: 7.4±0.3
NCO/kg.: 1.75±0.07 and 4,4'-diamino-diphenylmethane dissolved in methylethyl-ketone (100 parts of hardener for 150 parts of solvent in such a manner that one has 50 g. of diluted hardener for 100 g. of prepolymer).

Then one follows this application at one metre with that of shredded fibres coming from the synderm industry being 2/10 to 1 mm. in length and obtained from strips of chrome tanned leather and from waste of various vegetable tanned leathers on the proportion of 35% of chrome tanned fibres and 65% of vegetable tanned fibres, the average humidity of this fibre mixture at the time of application being 16%. 150 g. of these fibres are applied per square metre.

This application is followed at one metre with a second application of elastomer, then with a second application of fibres, still at 1 metre, with a third application of elastomer and with a third application of fibres, these being unsorted and unconditioned, having sizes ranging from $\frac{1}{10}$ mm. to 1 cm. and more at the rate this time of 300 g./square metre.

The paper support and the material are rolled together 5 metres or 5 minutes after the last projection of fibres.

After ageing for 12 hours at ambient temperature the material is separated from the silicon paper. The sheet produced comprises six layers resistant to splitting: three of elastomer and three of elementary leather fibres successively alternating. It is scraped on the flesh side with tanning rubbing machine covered with abrasive paper of 180 international grain.

The flesh side is coloured by applying with a spray a 30 g./l. aqueous solution of brown acid dyestuff mixed with 50 g./l. of a non-ionic wetting agent.

The hair side of the material is treated with 70 g. per square metre of a 30 g./l. solution of a brown dyestuff in methylglycol mixed with 100 g./l. of ethyl acetate, 100 g./l. of dimethylformamide and 50 g./l. of a solution of plasticised nitrocellulose at 20% of dry extract. After drying one applies 70 g. per square metre of a cellulosic fixative normally used in the tanning industry.

One can also proceed with immersion in water for 4 hours of the sheet produced, then dye with 300% water at 60° C. for one hour in a tanning fulling machine with 5% of a red anionic dye. After drying on a frame and making the flesh side velvety with abrasive paper, one obtains a material of the "Hunting" type of leather having the above characteristics.

EXAMPLE 3

With the aid of a curtain machine of the Burkle type comprising a system having two lips the distance apart of which is adjustable, a recycling pump, a conveyor belt with a speed ranging from 20 to 110 m./minute, one applies on silicone paper 200 g. per square metre of a mixture obtained by dissolving 1 kg. of the prepolymer used in Example 1 and 1 kg. of a prepolymer prepared in the same conditions but possessing the following characteristics:

Viscosity: 670 centipoises
Percent free NCO: 8.4
NCO/kg.: 2 in 5 kg. of methylethylketone mixed with 0.4 kg. of 3,3'-dichloro-4,4'-diamino-diphenylmethane. Ten minutes later one applies on the elastomer the hair side of a vegetable tanned cow butt which has been split in two when dry according to its thickness. Then one applies on the layer of leather (saw side) 300 g. per square metre of the above mentioned mixture. Finally one applies on the elastomer the saw side of the second half of the split butt, previously sandpapered with abrasive paper, without any pressure other than manual pressure at the end of the belt or 25 seconds after the spreading of the elastomer.

One obtains a material which is resistant to splitting, comprising 2 layers of elastomers and 2 layers of leather successively alternating. After ageing for 48 hours comparative tests of leather and the leather-polyurethane compound revealed the following:

|  | Treated leather | Normal leather |
|---|---|---|
| Thickness, mm | 6.2 | 6. |
| Impermeability to water—water column (under 1 metre) | >48 hours | 2 hours. |
| Permeability to water vapour | 58.7 | 63.2. |
| Resistance to nailing | Very good | Moderate. |
| Resistance to tearing, kg./mm | 12 (thickness) | 8 (thickness). |
| Resistance to pulling, kg./mm.² | 2.8 (surface) | 2.2 (surface). |

EXAMPLE 4

Following the technique used in Example 1 and with the same elastomer compositions one applies on silicone paper previously artificially calendered at 60° C. under 200 kg./cm.², 320 g. per square metre of the elastomer composition.

Immediately after this application one applies a chrome tanned strip called "third split" taken from leather unsuitable for any commercial purpose and having the following characteristics:

Resistance to pulling: 0.3 kg./mm².
Resistance to tearing: 0.1 kg./mm.
Thickness: 0.15 mm.
Average length of the fibres of the velvety side: $\frac{1}{10}$ approx.

The elastomer application and the application of an identical strip are repeated twice, the operation being completed by the application of the above-mentioned strip. Between the application of the elastomer and that of the strip there is an interval of 1 minute 30 seconds in each operation. 5 minutes after the last strip has been applied the whole is removed from its paper support.

The material thus obtained comprises 6 layers resistant to splitting: 3 of elastomers and 3 of leather successively alternating; and possesses all the external appearances of a fine quality pigmented and grained strip. It has the following characteristics after 24 hours storage:

Thickness: 1.1 mm.
Resistance to tearing: 1.5 kg./mm.
Resistance to pulling: 1.3 kg./mm$^2$.
Resistance on the Bally flexometer: 60,000 flections
Permeability to water vapour: 96.2
Impermeability to water (liquid): total This material can be used in the footwear industry as upper leather.

The combination of separated fibres and naturally interwoven fibres can be used; particularly in short continuous production one can fill the spaces between the discontinuous sheets, which are the leathers used in the present example, by following the technique used in Example 2, which produces a material in a continuous sheet making it possible to exploit all the waste of the leather industry.

EXAMPLE 5

In the process described in Example 4 one precedes the application of the second of the split strips with that of a gauze fabric having the following characteristics:

Size of threads: 140 to 160 microns
Weft threads: 10 per cm.
Warp threads: 10 per cm.
Resistance to tearing: 1 kg./test piece 5 cm. in length
Resistance to pulling: 9.6 kg./ditto
Square mesh of 1 mm. approx.: —

Applied onto the elastomer before the split strip the latter sticks to the elastomer through the interstices of the mesh.

After removal from mould the material obtained is resistant to splitting; it comprises 7 layers which are successively: elastomer, leather, elastomer, fabric, leather, elastomer, leather.

It possess all the characteristics of that obtained in Example 4, but it resistance to tearing is improved by 1 kg./mm. and its resistance to pulling by 3 kg./mm.$^2$.

EXAMPLE 6

In the process described in Example 1 the projection of leather fibres is replaced by that of a polyamide flock having the following characteristics:

3 to 5 denier
0.5 to 2 mm. in length and having undergone antistatic treatment.

Following the process of Example 1, 445.5 g. per square metre of a mixture of prepolymer, pigment, and methylene dianiline solution is applied to a sheet of silicone paper. This application is followed by one of 200 g./square metre of the flock mentioned above, projected by electrostatic sifting. The projection of polyurethane elastomer is repeated in the same conditions, then that of the polyamide flock. 15 minutes after the final projection of fibres the material is removed from the mould. It comprises 2 layers of elastomer and 2 layers of polyamide fibres alternating successively and resistant to splitting. After 24 hours maturing this material possess the following characteristics:

Thickness with compression of the fibres: 0.5–0.6 mm.
Thickness without compression: 2.2–2.4 mm.
Resistance to tearing:
2.5 kg. (test piece 10 cm. long 2 cm. wide)

Resistance to pulling: 17 kg. test piece 10 cm. long 2 cm. wide)
Resistance on Bally flexometer: 60,000
Permeability to water vapour (24 hours): 84
Weight: 800 g./square metre

EXAMPLE 7

In the process of Example 6 the projection of the elastomer is followed 30 seconds later by the application of the gauze used in Example 5. 30 seconds later one applies on this gauze 300 g. per square metre of the elastomer mixture then after 20 seconds one proceeds with the projection of 200 g. of flock fibres per square metre and, after 20 seconds, again with the projection of 300 g. per square metre of the elastomer mixture then after 20 seconds with the projection of 200 g. per square metre of fibres. The material which resists splitting comprises the following layers in order: elastomer, fabric, elastomer, polyamide fibres, elastomer, fibres.

10 minutes after the last projection the material is removed from the mould; it has the following characteristics Thickness under compression: 0.6 mm.
Thickness without compression: 2.2 mm.
Resistance to pulling: 10 kg. (test piece 10 cm. long and 2 cm. wide)
Resistance to tearing: 3.5 kg. (test piece 10 cm. long and 2 cm. wide)
Resistance on Bally flexometer: 60,000
Weight: 900 g./square metre
Permeability to water vapour: 78
Impermeability to water (under a 1 m. water column): more than 24 hours The materials obtained in Examples 6 and 7 are present on their fibrous side a "moquette" appearance. They are suitable for the manufacture of slippers.

EXAMPLE 8

In the 1st stage, with the aid of the machine described in Example 1 one projects directly onto a woven linen textile support and unrolling at 1.20 m./minute a film 3/10 mm. thick of the elastomer used in the previously mentioned example.

The characteristics of the textile support used are as follows:

Thickness: 0.5 mm.
Resistance to tearing: 5 kg. (test piece 5 cm. long)
Resistance to pulling: 13 kg. (test piece 5 cm. long)

One follows this application with one of the polymide flock described in Example 6. 10 minutes after this projection the flocked material is rolled onto bobbins.

In the 2nd stage, one continuously projects the same elastomer, following the same technique, on silicone paper, at 1.20 m./minute, in such a manner that one obtains a film 3/10 mm. thick. Immediately after this projection, one assembles continuously the material produced in the 1st stage (flock in contact with the soft elastomer) by passing the two sheets namely: paper covered with elastomer and flocked material, unrolling from the bobbin at the same speed, between two cylinders exerting a pressure of 50 g./square centimeters. The fibres of the blocked material penetrate the elastomer and bend back in contact with the paper, creating hooks which improve the adhesiveness. The whole, paper included, is rolled 10 minutes after assembly.

The roll of material obtained is then possibly continuously flocked again on the opposite side of the paper, in the same conditions as for the 1st stage of this operation, in order to create a flesh appearance.

The whole when removed from the mould possesses the following characteristics:

Thickness: 1.4 mm.
Resistance to tearing: 5.5 kg. (test piece 5 cm. long)
Resistance to pulling: 13.0 kg. (ditto)

and is suitable for seat covers, morocco-leather work and footwear.

EXAMPLE 9

In the same conditions as in Example 3 and with the same machine one applies on silicone paper 400 g./square metre of the following mixture:

Polyurethane prepolymer: 1,218 parts...NCO/OH=1.2
Polyether: 505
Cellulose acetobutyrate: 20
Stannous octoate: 30
Butyl acetate: 200
Ethyl acetate: 340
Toluene: 960

After 20 minutes one proceeds with the operations described in Example 3, but replacing the elastomer used in Example 3 with the mixture shown above.

After ageing for 48 hours the material thus obtained (4 layers) possesses most of the characteristics of the material of Example 3.

EXAMPLE 10

Following the technique of Example 1, with the same polyurethane elastomer and the same products, one projects 300 g./square metre of polyurethane elastomer on the moulding of a natural fine quality "shrunk" leather obtained with the aid of a silicone elastomer and reproducing the negative imprint of the leather.

45 seconds after the projection one applies onto the elastomer a sheet made of long fibres (3 to 7 cm.) of cellulose (70%) and of polyamide (30%) partially bonded previously to facilitate handling with 7 g./square metre of an emulsion of acrylic resin producing a sheet without mechanical properties and commercially unsuitable. (The nature of this emulsion has no effect on the finished material.)

The sheet thus produced weighs 45 g./square metre and is $15/100$ mm. thick.

Next one projects 300 g./square metre of polyurethane elastomer onto the fibrous sheet in such a way that this elastomer impregnates the entire surface and one assembles 40 seconds after this second projection a second sheet from the preceding sheet of fibres, by passing the whole between two rubberised cylinders at weak pressure (5 to 30 g./square centimetre); this operation is again repeated a third time.

After removing from the mould the material comprises a surface layer of polyurethane faithfully reproducing the pattern of the leather original (1), a layer of fibres (2) bonded to this surface layer and firmly bonded together with a second layer of polyurethane (3), a layer of fibres (4) bonded together and to the layer (2) by the same polyurethane (3), a layer (5) of a fibres-polyurethane complex, a layer (6) of fibres bonded to layer 5 by the polyurethane but partly free on their other side.

This new material presents the following characteristics:

Thickness: 0.9 mm.
Resistance to pulling: 1.5 kg./mm.$^2$
Resisatnce to tearing: 1.5 kg./mm.
Weight: 950 g./m.$^2$
Permeability to water vapour: 35

It resists splitting and can be immersed in water for more than 24 hours without harmful effects.

What is claimed is:

1. Process for the preparation of composite material which comprises a simultaneously applying to a non-adherent support, a liquid polyurethane which is curable to the elastomeric state and which contains free NCO groups and a liquid hardener or a hardener in solution in an inert solvent; then applying a layer of fibers on a layer thus obtained before total hardening; then simultaneously applying on the layer of fibers a liquid polyurethane which is curable to the elastomeric state and which contains free NCO groups and a liquid hardener or a hardener in solution in an inert organic solvent; then applying a second layer of fibers on the layer thus obtained before complete hardening and finally separating the materials so produced from the non-adherent support.

2. Process according to claim 1 wherein the application of the polyurethane and hardener and the application of the fibres are repeated until the desired thickness is obtained.

3. Process according to claim 1 wherein the liquid polyurethane and the hardener are applied by projection.

4. Process according to claim 1 wherein the liquid polyurethane and the hardener are applied by spreading.

5. Process according to claim 1 wherein the liquid polyuethane containing free NCO groups is a polycondensate of polyol and di-isocyanate.

6. Process according to claim 1 wherein the hardener is a diamine.

7. Process according to claim 1 wherein the fibres have a level of humidity which is higher than the normal level in the ambient medium.

References Cited

UNITED STATES PATENTS

| | | | |
|---|---|---|---|
| 3,496,056 | 2/1970 | Steel et al. | 161—156 X |
| 3,582,423 | 6/1971 | Wang | 161—Dig. 2 |
| 3,551,830 | 12/1970 | Hodge et al. | 117—135.5 |
| 3,355,535 | 11/1967 | Hain et al. | 264—321 |
| 3,364,098 | 1/1968 | Patsis | 161—156 |
| 3,398,042 | 8/1968 | Odenthal et al. | 161—190 |
| 3,418,198 | 12/1968 | Einstman | 117—135.5 |

U.S. Cl. X.R.

156—247, 289; 161—88, 156, 190

GEORGE F. LESMES, Primary Examiner
W. R. DIXON, JR., Assistant Examiner